United States Patent [19]

Imai et al.

[11] Patent Number: 4,815,759
[45] Date of Patent: Mar. 28, 1989

[54] VEHICLE WITH STEERING-CONTROLLED TORSION BAR STABILIZER

[75] Inventors: Tetsuo Imai, Coon Rapids; Gregory J. Marier, Brooklyn Prk; Wayne L. Warnke, Wayzata, all of Minn.

[73] Assignee: Yamaha Hatsudoki Kabushiki Kaisha, Iwata, Japan

[21] Appl. No.: 948,096

[22] Filed: Dec. 31, 1986

Related U.S. Application Data

[63] Continuation-in-part of Ser. No. 722,950, Apr. 15, 1985, abandoned.

[51] Int. Cl.$^4$ .............................................. B62B 17/04
[52] U.S. Cl. ................... 280/21.1; 188/82.8; 192/41 A; 192/45.1; 280/665; 280/689; 280/695; 280/723
[58] Field of Search .............. 280/21 R, 16, 21 A, 280/689, 695, 723, 772, 755, 664, 665; 188/82.8, 82.84; 192/41 A, 45.1

[56] References Cited

U.S. PATENT DOCUMENTS

| | | | |
|---|---|---|---|
| 3,197,233 | 7/1965 | Van Winsen et al. | 280/DIG. 1 |
| 3,730,316 | 5/1973 | Zimmer | 192/45.1 |
| 4,094,532 | 6/1978 | Johnson et al. | 280/695 |
| 4,153,272 | 5/1979 | Fielder et al. | 280/689 |
| 4,372,567 | 2/1983 | Yasui et al. | 280/21 R |

OTHER PUBLICATIONS

Machine Design, Jun. 28, 1984, pp. 56–63.

*Primary Examiner*—David M. Mitchell
*Assistant Examiner*—Eric Culbreth
*Attorney, Agent, or Firm*—Orrin M. Haugen; Thomas J. Nikolai; Frederick W. Niebuhr

[57] ABSTRACT

An anti-sway system for a steerable vehicle of the type employing a torsion bar suspension. Operatively coupled to the torsion bar for each of the vehicle's steerable wheels or skis is a mechanism for increasing the effective spring rate of the suspension upon cornering over that prevailling when steering a straight line course.

4 Claims, 5 Drawing Sheets

VEHICLE WITH STEERING-CONTROLLED TORSION BAR STABILIZER

This is a continuation-in-part of application Ser. No. 722,950 filed Apr. 15, 1985 now abandoned.

BACKGROUND OF THE INVENTION

I. Field of the Invention

This invention relates generally to a stabilizer system for a recreational vehicle, such as a four-wheeled, soft tire vehicle or a snowmobile, where the vehicle is equipped with a torsion bar or other spring-type stabilizer, and more particularly to control mechanisms for increasing the effective spring rate of the outside wheel or ski during cornering maneuvers to thereby decrease the sway of the vehicle due to centrifugal force.

II. Discussion of the Prior Art

In a co-pending application of Gregory J. Marier filed concurrently herewith (U.S. Pat. No. 4,593,921, issued June 10, 1986) and entitled "Stabilizer System For A Snowmobile", there is described a means of adjusting the "stiffness" of a suspension system of the type incorporating a shock absorber having an air cushion such that the outside ski of the vehicle exhibits a relatively high spring constant as compared to the inside ski during a turning maneuver. As is explained in the aforereferenced Marier patent application, snowmobiles and the popular off-road wheeled vehicles having the large, low pressure tires are generally designed to have a large vertical excursion of the wheel or ski, upon hitting an irregularity in the terrain. A partial solution to the roll or sway problem occasioned by such a suspension system has centered around the incorporation of a torsion bar. The conventional manner of applying a torsion bar to a snowmobile-type vehicle is set out in the Yasui et al U.S. Pat. No. 4,372,567. When the snowmobile in accordance with the Yasui et al patent is traversing a straight-line path, the torsion bar helps suppress shock and vibration. This arrangement has a drawback in that if, while negotiating a turn, the inside ski encounters a bump, the anti-sway force exerted by the stabilizer bar upon the outside ski is interrupted and the vehicle handling characteristics are changed suddenly.

The present invention describes a method and apparatus for obviating the foregoing problem. A control apparatus is coupled to the torsion bar or spring-type stabilizer so as to increase the effective stiffness or spring rate of the suspension of the outside wheel or ski as the vehicle negotiates a turn while, at the same time, decoupling the stabilizer system from the inside ski or wheel so that it is free to operate independently. Thus, even if a bump is encountered during a cornering maneuver, there are no sudden handling changes but, in fact, the vehicle exhibits a steady reistance to swaying throughout the full maneuver.

SUMMARY OF THE INVENTION

In accordance with one embodiment of the invention, the vehicle has an independent torsion spring for each steerable wheel/ski member. Operatively coupled to each torsion spring is a hydraulic cylinder which is oil filled and which communicates through suitable hydraulic lines and a valve member to an air cushion chamber. The valve member is coupled to the steering assembly. When the steering wheel is disposed for a straight-ahead path of travel, the hydraulic lines extending between the hydraulic cylinders and their respective air cushion chambers are unblocked, and the effective spring rate of the system is of a first predetermined value. Upon cornering, however, the control valve moves to a position blocking the flow of hydraulic fluid between the cylinder and its associated air cushion chamber corresponding to the outside wheel/ski while leaving the line extending between the hydraulic cylinder and its air chamber of the inside ski open. With the valve blocking flow of fluid from the outside wheel's hydraulic cylinder to its air cushion chamber, one end of the torsion bar becomes basically fixed or locked relative to the vehicle's frame and the amount of force required to twist the torsion bar is substantially increased. This effectively inserts the torsion bar spring of the outside ski in parallel with that ski's independent suspension spring and tends to prevent the vehicle from swaying during the turning maneuver.

In accordance with a second embodiment, the hydraulic pistons/air chambers and valve are replaced with a mechanical sprag whose inner race is keyed to one end of the torsion bar and whose outer race is fixedly attached to the chassis. Cams or sprags are mounted between the two circular races and are controlled so that rotation of the torsion bar in a first direction during da cornering maneuver wedges the sprags between the two races and effectively inserts the torsion bar into the mechanical suspension. Reverse rotation of the torsion bar, however, rocks the sprags out of their wedging engagement, freeing the torsion bar from the chassis. Means are provided for controlling the cam position in the sprag in accordance with the steering position of the vehicle. During straight-ahead driving, the cams of the sprag are disengaged but, when cornering, the cams of the sprag associated with the outside wheel are engaged and the torsion bar adds to the stiffness of the suspension system and inhibits the sway tendency.

In a third arrangement, a one-way clamp is suitably disposed either between the torison bar and a member fixed to the chassis or between the torsion bar and the reciprocally movable steerable member. As was true with the other embodiments, the clamp is actuable to lock the end of the torsion bar of the outside ski or wheel to its associated member during turning.

OBJECTS

It is accordingly a principal object of the present invention to provide an improved torsion bar stabilizer system for a steerable vehicle in which the torsion force introduced is controlled as a function of steering direction.

Another object of the invention is to provide an improved stabilizer system for a steerable vehicle in which the stabilizing forces are independently applied to the particular wheel or ski which is on the outside during a cornering maneuver.

Yet another object of the invention is to provide a hyraulic control over the amount of force exerted through the stabilizing spring to the vehicle chassis.

Still a further object of the invention is to provide a torsion bar stabilizer system for the steerable wheels/skis of a vehicle where the stiffness of the suspension system for each of the steerable wheels/skis is independently controlled by a hydraulic mechanism and in accordance with the steering disposition of such wheel/ski assembly and with the condition of the suspension system at the moment the turn is made.

Another object of the invention is to provide independent torsion bar stabilizer for the steerable wheels/skis of a vehicle in which the application of the torsion forces is by way of a one-way clutch assembly or a one-way clamp assembly.

These and other objects and advantages of the invention will become apparent to those skilled in the art from the following detailed description of a preferred embodiment, when considered in conjunction with the accompanying drawings in which like numerals in the several views refer to corresponding parts.

DESCRIPTION OF THE PREFERRED EMBODIMENTS

Figure 1:
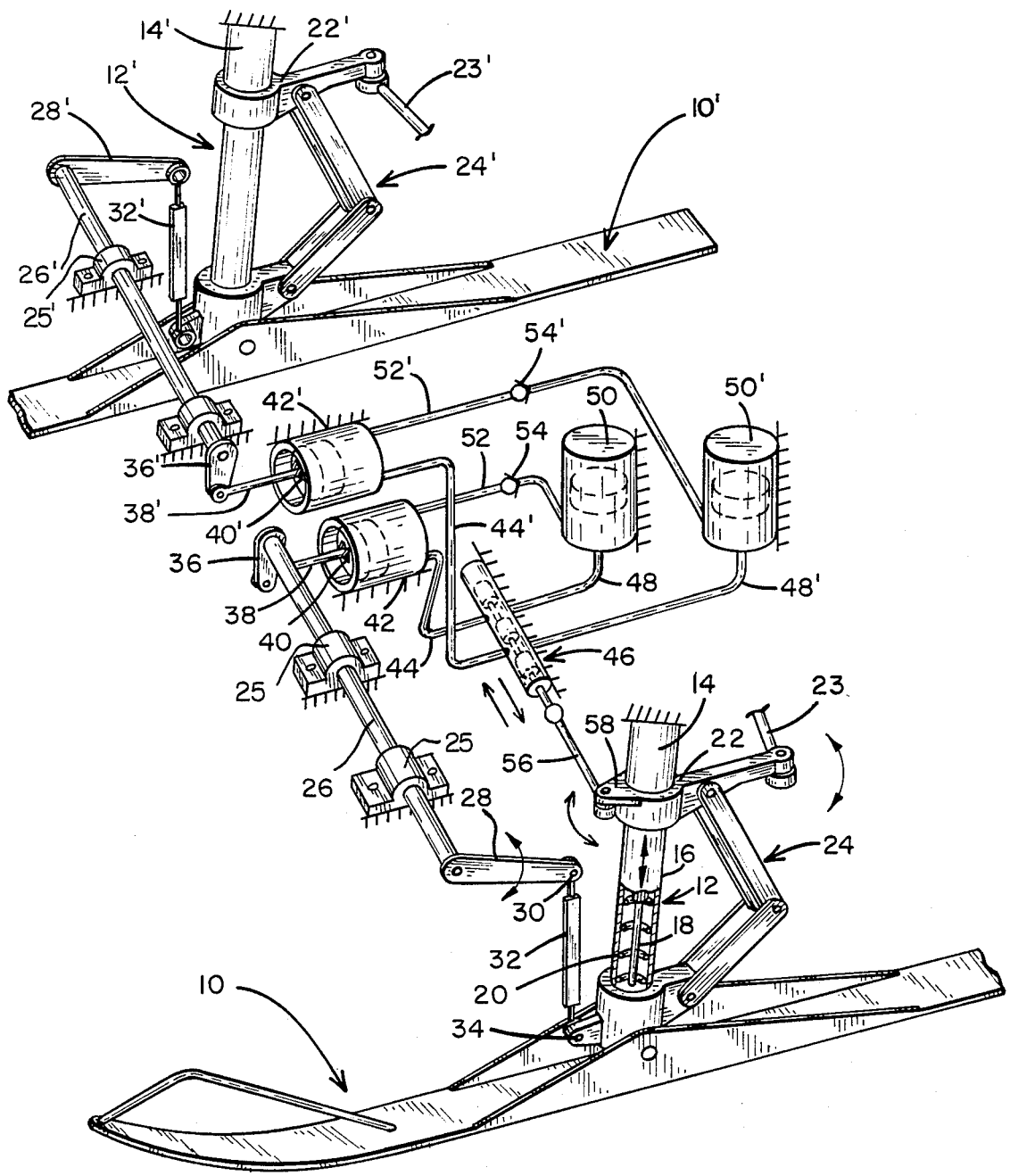
FIG. 1 is a partial perspective view of a snowmobile suspension system incorporating the anti-sway mechanism of the present invention.

Referring first to FIG. 1, there is shown a partial perspective view of the suspension system of a recreational vehicle, e.g., a snowmobile incorporating the present invention. While the drawing of FIG. 1 illustrates a pair of front skis 10 and 10' as the steerable ground-engaging member, those skilled in the art will recognize that the present invention may be equally well applied to a recreational, off-road vehicle incorporating front steerable wheels rather than skis. Hence the term "steerable member" as used herein is intended to encompass either wheels or skis.

The steerable members 10 and 10' are typically joined to the base of a strut assembly indicated generally numerals 12 and 12'. Each of the struts comprises an outer cylindrical casing 14 and an inner tubular member 16, which is sized so as to be telescopingly received within the outer casing 14. Suitable bearings (not shown) are provided between members 14 and 16 to permit reciprocating and rotational motion therebetween.

Contained within the confines of the hollow tubular strut members 14 and 16 are a shock absorber whose piston rod portion 18 is visible in the cut-away segment of the strut 12. Surrounding the shock absorber is a coiled spring 20. The device just described is a typical independent suspension arrangement for a recreational vehicle.

A steering arm 22 is rotatably mounted on the outer tubular member 14 and is linked to the ski 10 by an articulated arm assembly 24. A tie rod 23 joins the steering arm 22 to the steering arm 22' of the righthand steerable member 10'. The tie rod 23 is mechanically coupled through a suitable coupling mechanism to the vehicle's steering wheel shaft (not shown) so that rotation of that shaft causes the steerable members to rotate about the steering axis in unison when the steering wheel is turned.

The foregoing vehicle suspension system, as it has been described to this point in the specification, is somewhat conventional. When traversing a straight-ahead path, the suspension system affords a relatively smooth ride, even when traversin rough roads or trails. However, during cornering maneuvers at moderate-to-high speeds, centrifugal force can result in significant sway of the vehicle due to the relative softness of the suspension system used on most recreational vehicles intended for off-road use. Attempts to cure the sway problem have included the incorporation of a torsion bar in the suspension system and, in this regard, reference is again made to the aforereferenced Yasui et al U.S. Pat. No. 4,372,567 assigned to the assignee of the instant application. As is pointed out in the above-mentioned U.S. Pat. No. 4,593,921, the conventional use of a torsion bar to limit sway on turning has a drawback, especially where one of the steerable members encounters a sudden irregularity in the road or trail while travelling straight ahead. The additional spring force occasioned by the presence of a torsion bar tends to cause amplification in the pitching tendency of the vehicle. To obviate the foregoing problem so that a torsion bar system can effectively be used to inhibit the tendency to sway upon turning an off-the-road vehicle, in accordance with the present invention, there is provided a separate torsion bar for each of the steerable members. More specifically, with reference to FIG. 1, a first torsion bar 26 is provided for the lefthand steerable member and a separate torsion bar 26' is associated with the righthand steerable member. In that the two independent torsion bar assemblies are substantially identical, their construction will be explained with respect to the lefthand steerable member only. The torsion bars are secured to the frame by slide bushing brackets 25—25' and are thus free to slide during turning. Positively affixed to the torsion bar 26 is a torque arm 28, which is pivotally coupled by a spherical ball joint at pivot point 30 to a linkage 32 whose other end is likewise pivotally coupled to the steerable member 10 at 34 by a ball joint. Positively affixed to the opposite end of the torsion bar 26 is a further arm 36 to which a piston rod 38 is joined. The piston rod is, in turn, coupled through a wrist pin connection 40 to a piston contained within the hydraulic cylinder 42. The cylinder is filled with hydraulic oil and has an outlet port connected by a hydraulic line 44 to a slide value 46. A further hydraulic line 48 connects the slide valve 46 to the inlet of an air cushion 50. The air cushion 50 comprises a generally closed cylindrical chamber having a movable piston contained therein separating the oil chamber from an air chamber. When the piston is acted upon by hydraulic fluid, it moves to change the volume of air contained on the opposite side of the piston. A return line 52 having a one-way check valve 54 contained therein couples the air spring 50 back to the hydraulic cylinder 42.

Figures 2, 4:
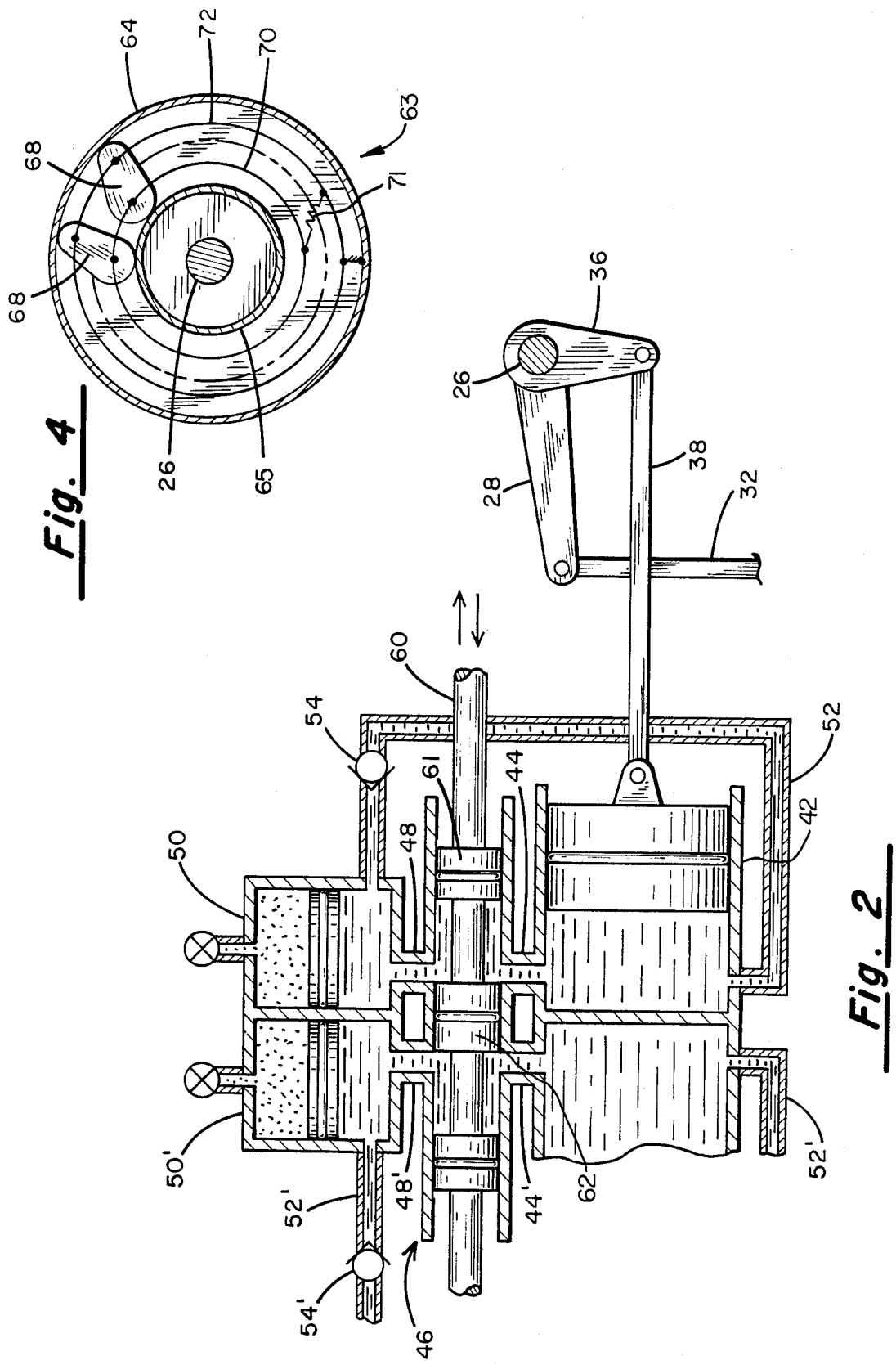
FIG. 2 is a schematic diagram of the hydraulic torsion bar control system of FIG. 1.
FIG. 4 is a partial cross-sectional view of a sprag type one-way clutch assembly used in the embodiment of FIG. 3.

The construction of the slide valve can best be visualized with reference to the schematic hydraulic diagram of FIG. 2. It includes an outer tubular member which acts as a cylinder for receiving a slidable piston 60 which is adapted to be coupled by linkage 56 to an ear 58 affixed to the steering arm 22. Thus, rotation of the sttering arm to the left or right causes corresponding sliding motion of the piston 60 within the valve 46. As is illustrated in FIG. 2, the piston 60 has three cylindrical lobes, each of which has an arcuate groove for receiving an O-ring seal. When the piston is in the position illustrated in FIG. 2, a fluid flow path exists between the cylinders 42–42' and their associated air cushions 50—50'. During a cornering maneuver, however, a center valve lobe 62 moves into a blocking relationship with respect to the flow path between the hydraulic cylinder and air cushion associated with the outer ski.

OPERATION

Now that the mechanical features of the preferred embodiment have been explained, consideration will next be given to the mode of operation and, in this regard, reference will be made not only to the partial perspective view of FIG. 1 but to the schematic hydraulic diagram of FIG. 2.

With continued reference to FIG. 2, the slide value 46 is shown in the position it assumes when the vehicle is traversing a straight-ahead path. The movable piston 60 is generally centered within the valve and is not in a position to block the valve orifices to which the hydraulic lines 48 and 48' are connected. Hence, a fluid communication path exists between the hydraulic cylinder 42 and the air cushion 50 and between the hydraulic cylinder 42' and its air cushion 50'. The cylinder 42 and the air cushion 50 can be considered as a first actuatable means while devices 42' and 50' are a second actuatable means. Thus, rotation of the torsion bar 26 by the up-and-down motion of the lower suspension arm 32 is effectively cushioned as the hydraulic oil flows between the associated hydraulic cylinder/air cushion pair. In a similar fashion, the twisting of the torsion bar 26' upon up-and-down motion of the steerable member 10' is resisted only by the compression of the air contained within the air cushion 50' which is, of course, independent of the vertical motion of the other steerable member 10. This resistance is slight compared to the torsion bar's spring rate so the ski's spring force does not drastically increase.

Next, let it be assumed that the steering wheel is turned so that a lefthand turn results. As is illustrated in FIG. 1, when the lefthand steerable member 10 is turned to the left, the connecting linkage 56 joining the slide 60 to the steering arm 22 draws the slide 60 to the right (when viewed in FIG. 2) causing the center valve lobe 62 to assume a position in blocking relationship to the orifice leading to the air cushion member 50 of the first actuatable means. Because the hydraulic fluid is incompressible, the piston rod 38 does not allow rotation of the innermost end of the torsion bar. However, the orifice to which the hydraulic line 48' is connected, and which leads to the air cushion 50' of the second actuatable means, remains open such that the righthand ski 10' motion remains cushioned by the compressible fluid (air) contained within the member 50'.

If the spring rate of one of the torsion bars is represented by the constant $K_1$ and the spring rate of the air cushion is represented by $K_2$, during a straight-ahead run, the valve joining the hydraulic cylinders to their associated air cushions is open, and the spring rate of the combinations may be expressed as:

$$K_S = \frac{K_1 K_2}{K_1 + K_2}$$

where $K_S$ is the spring rate during straight-ahead travel. Upon cornering, the control valve is moved to a blocking position relative to the line connecting the hydraulic cylinder of the outside steerable member to the associated actuatable air cushion such that the spring rate of the suspension associated with the outside steerable member is the spring rate of the torsion bar itself or, $$K_C = K_1$$

where $K_C$ represents the spring rate while cornering. At this time, however, the spring rate of the inside steerable member, upon cornering, is the same as the spring rate existing during a straight-ahead run because the valve associated with the inside steerable member remains open. It is readily apparent from the foregoing equation that: $K_C > K_S$. That is, the effective stiffness of the suspension system supporting the outside steerable member, upon turning, is much greater than the stiffness of the suspension system for the inside steerable member.

The purpose of the one-way check valves 54 and 54' is to allow hydraulic fluid to flow back to the cylinders 42 or 42' in the event that the vehicle begins cornering when the outside steerable member is depressed because of encountering a bump in the tail. Under these conditions, and assuming that it is the lefthand steerable member that is on the outside of a turn, the valve slide 60 is positioned such that its element 62 is in blocking relationship with the flow path between the oil-filled portion of the cylinder 42 and the actuatable air cushion member 50. If the lefthand steerable member 10 drops, then piston rod 38 is drawn forward, when viewed in FIG. 1, and creates a suction stroke, opening the one-way check valve 54 and allowing the oil to be drawn from the air cushion 50 back into the cylinder 42.

ALTERNATIVE EMBODIMENT

Figure 3:
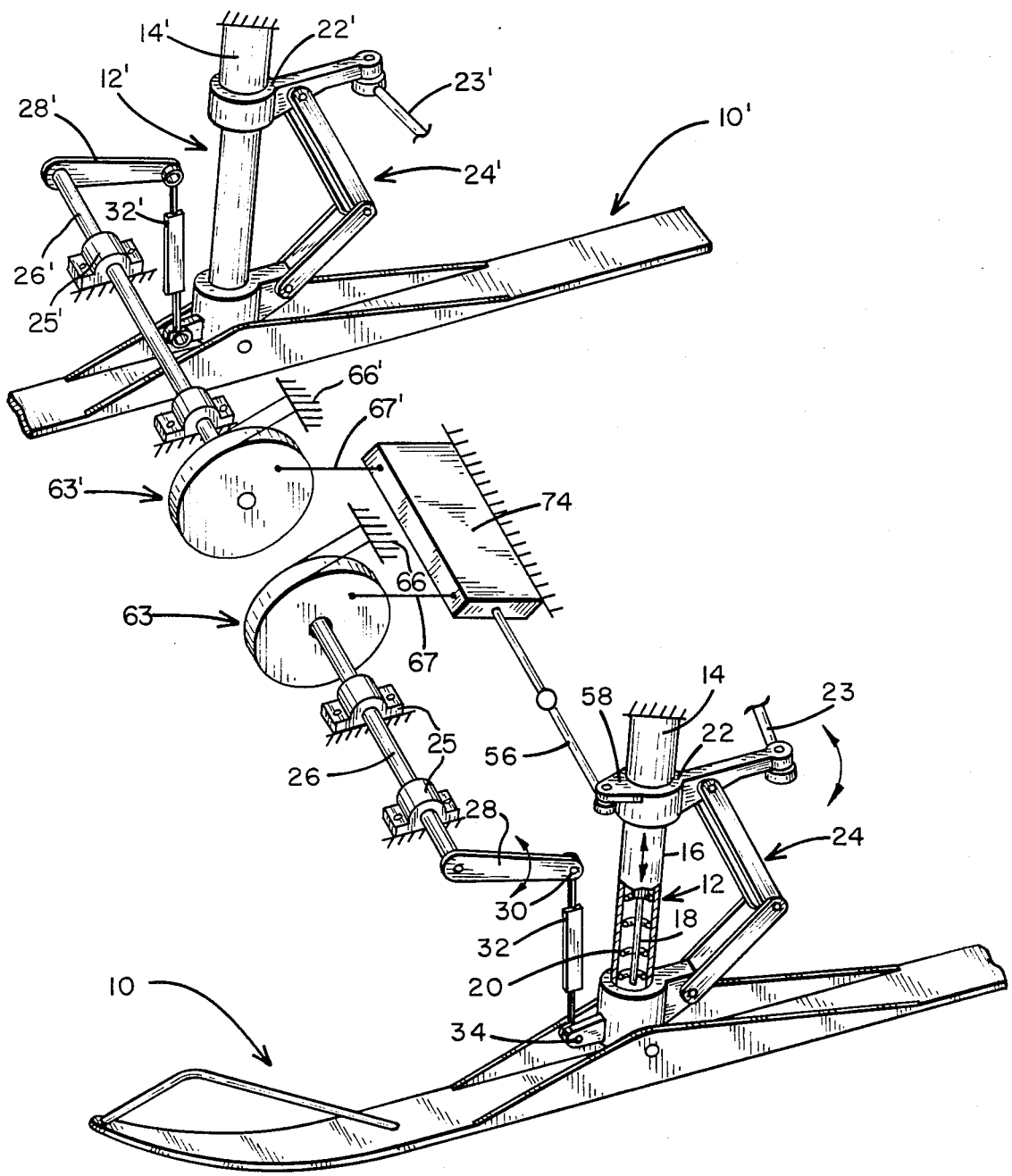
FIG. 3 is a partial perspective view of a vehicle suspension system comprising an alternative embodiment incorporating a one-way clutch.

In the embodiment of FIG. 3, the actuatable means in the form of hydraulic cylinders and air cushions of FIG. 1 are replaced with an alternative actuatable means, i.e., a mechanical one-way clutch commonly referred to as a sprag. As those skilled in the art will recognize, a sprag comprises two circular races which are concentrically mounted and which are of differing radii. Disposed between the two races are a plurality of cams which can be moved in unison by a suitable control means to assume either a wedging or a non-wedging disposition between the two races. When the wedging condition prevails, rotation of the drive race in the proper direction imparts corresponding rotation to the driven race. However, when the cams are in their non-wedging disposition, the drive race has no coupling to the driven race. Those wishing further information relative to the construction and operation of a sprag-type one way clutch are referred to pp. 56-64 of *Machine Design*, dated June 28, 1984.

With reference to FIG. 3, because the construction of the strut 12, the steering arm 22 and the torsion bar assemblies 26, 28 and 32 have already been described in connection with the embodiment of FIG. 1, it is deemed unnecessary to repeat that description here. Suffice it to say, the linkages 36-36', the hydraulic cylinders 42 and 42', the slide valve 46 and the air cushion members 50 and 50' have been replaced with free-wheeling clutches or sprages 63 and 63'. As shown in FIG. 4, sprag 63 is shown in partially broken away form so as to reveal an inner race 65, which is attached to and rotatable with the innermost end of the torsion bar 26. A similar sprag is likewise attached to torsion bar 26'. The outer race 64 of the sprag 63 is attached to the chassis or frame of the vehicle as at 66 (as is the outer race of sprang 63', at 66'). Disposed between the inner race 65 and the outer race 64 are a plurality of cams or sprag, only two of which are shown and which are identified by numeral 68. The cams preferably have rounded base and tip portions of differing radii and may be coupled together by concentric control rings 70 and 72 which pivotally coupled to all of the cams at the centers of curvature of the respective base and tip portions. Control ring 72 may be connected to the stationary outer race 64 and a tension spring 71 may be joined between control rings 70 and 72 to normally urge cams 68 in a non-wedging disposition. It can be seen, then, that by shifting the inner control ring 70 relative to the outer control ring 72, all of the cams coupled by these rings may be simultaneously moved between their wedging and non-wedging dispositions relative to the inner race 65 and the outer race 64.

Various means are mavailable for controlling the shifting movement of the control ring 70 relative to ring 72. The positioning between them may be controlled by an electrical actuator, or a hydraulic actuator arranged to put on cable 67 or 67' joined to the ring 70 or another simple wire cable connection. Because various alternatives are available, the control mechanism is represented schematically in FIG. 3 by a block 74, which is operatively coupled to the linkage 56 associated with the steering arm 22. Thus, when steered to the right or left, one or the other of the sprags 63 or 63' will have its associated control ring 70 actuated move the associated cams 68 to their wedging disposition against the force of return spring 71. The outer sprag will remain in its free-wheeling condition during cornering. During straight-ahead travel, the device 74 the associated allows spring 71 to move the control ring 70 so that the sprag element 68 do not become wedged and, therefore, do not effectively couple the ends of either associated torsion bar 26 or 26' to the vehicle's frame.

As mentioned above, th sprag is effectively a oneway clutch. Thus, if the outside steerable member is compressed when a cornering maneuver is made and if a depression should occur in the terrain being traveled causing that steerable member to again extend, it does so without loading the torsion bar. Thus, it is only during the compressive movement of the outside steerable member that torque is applied to the torsion bar. This prevents the spring force of the torsion bar from offsetting that of the independent suspension springs 20 in the direction of extension.

In FIG. 3, the sprags 63—63' are shown as being operatively disposed between the ends of the torsion bras 26—26' and the vehicle's frame. It is also possible to locate the sprag assembly 63 between the bar 26 and the linkage arm 28 and achieve the same desired result of increasing the stiffness of the suspension of the outside steerable member when turning.

SECOND ALTERNATIVE EMBODIMENT

Figure 5:
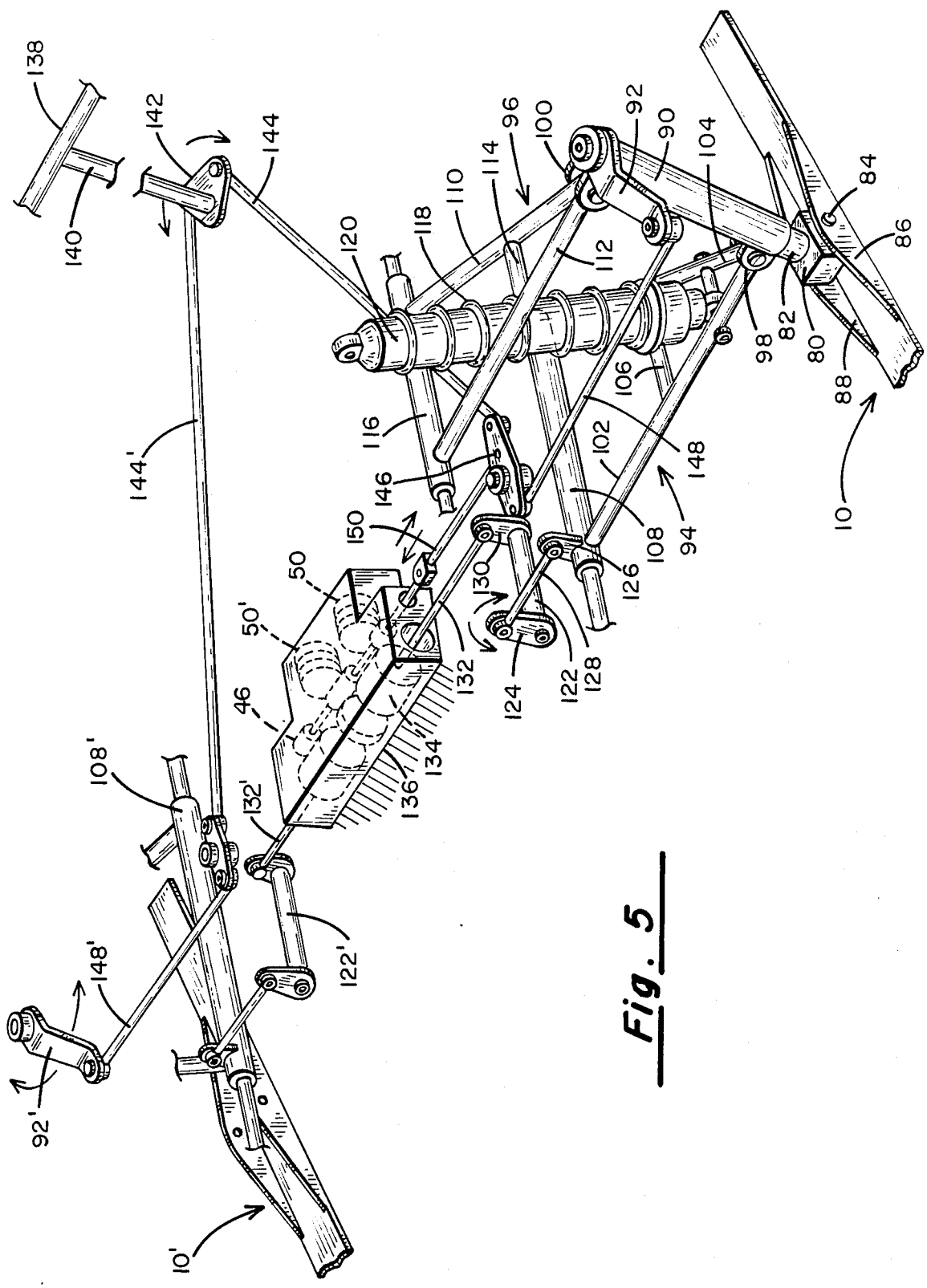
FIG. 5 illustrates the application of the present invention to a snowmobile having a double A-arm suspension.

Referring to FIG. 5, there is illustrated a partial perspective view of an alternative embodiment showing the manner in which the anti-sway system can be applied to a snowmobile vehicle of the type using a double-A-arm suspension rather than the telescopic strut suspension illustrated in the embodiments of FIGS. 1 and 3. In that the suspension system illustrated in FIG. 5 is, for the most part, bilaterally symmetrical, only the constructional features associated with the lefthand ski will be described, it being understood that the righthand ski and its suspension system is substantially identical.

In FIG. 5, the ski 10 is shown as being pivotally joined to the lower end 80 of a column 82 by means of a pivot pin 84 which passes through aligned holes formed in the base 80 and in flange members 86 and 88 which procject upward from the top surface of the ski 10. The column 82 is fitted into the center of a tubular pivot pipe member 90 and affixed to the upper end of the column 82 is a steering arm 92.

The ski pivot pipe 90 is joined to the frame by way of a lower A-arm assembly 94 and an upper A-arm assembly 96. More particularly, projecting from the inwardly-facing side of the pivot pipe 90, as is viewed in the drawing, is a lower clevis connection 98 and an upper clevis connection 100. The lower A-arm assembly 94 comprises first and second rigid bar 102 and 104 which are joined at an acute angle and at their apex connects to the lower clevis 98. An intermediate support strut 106 is welded in place between the bars 102 and 104 as in the letter "A" and the other ends of those two arms are also welded to a tubular member 108 which surrounds a cylindrical tube or bar comprising a portion of the snowmobile vehicle's frame.

The upper A-arm is of generally similar construction. It, too, is comprised of first and second struts 110 and 112 which are joined at an apex to the clevis 100 and which have cross-members 114 and 116 welded thereto to form a strong, rugged suspension arm. The member 116, like the member 108 at the lower arm, is tubular and surrounds a cylindrical bar portion of the frame. The inside diameters of the tubular members 108 and 116 are such that pivoting or rocking motion about the enclosed horizontal frame portions results.

A combination of a coil spring 118 surrounding a hydraulic shock absorber 120 is operatively coupled between the frame (not shown) and the lower A-arm assembly 94. The spring and shock absorber operate in a conventional fashion to cushion the vehicle against shocks to which the skis 10 may be subjected during travel over irregular surfaces.

Anti-sway properties are added to the suspension system by means of a torsion bar 122 which is attached at a first end to a link 124. The link 124 is joined to a projecting ear 126 attached to the pipe 108 by means of a linkage 128. The other end of the torsion bar 122 is likewise fastened to a link 130 which is pivotally joined to a connecting rod 132 which is joined to a piston 134 disposed in a cylinder block 136.

To steer the vehicle, handlebars 138 attached to a steering column 140 are used to rotate a linkage 142 to which a steering link 144 is pivotally secured. The link 144 joins to a pivot arm 146 which is arranged to rotate in a generally horizontal plane about a vertical pin projecting upward from the frame (not shown). A steering tie rod 148 is joined proximate one end of the arm 146 to the member 92 affixed to the ski pivot pipe 82. Thus, rotation of the steering handle 138 will cause the ski 10 to turn about the steering axis passing through the ski column 82.

Also coupled to the rotatable arm 146 is a valve control linkage 150 leading to a slide valve contained within the cylinder block 136. Also contained within the cylinder block 136 are actuatable means in the form of the air chambers which are configured much the same as is illustrated in the diagram of FIG. 2. The slide valve serves as a control means to selectively block and unblock the flow of hydraulic fluid from the cylinder associated with the piston 134 to its air cushion chamber, all as has been previously described in connection with the embodiment of FIG. 1. One-way check valves similar to valves 54 and 54' in FIG. 1 are also embodied in the anti-sway hydraulic control mechanism illustrated in FIG. 5.

In operation, and assuming that the vehicle is traveling in a straight-ahead direction, the suspension system heretofore described allows the double-A-arm assemblies to rock up and down as the skis encounter changes in the terrain. Sudden shocks are cushioned by the coil spring 118 and dampened by the shock absorber 120. As was the case with the embodiment of FIG. 1, during straight-ahead motion, the slide valve is positioned to permit hydraulic fluid to flow between the cylinder containing the piston 134 and its associated air cushion chamber.

When the steering handle 138 is turned, the rotational motion is transmitted through the steering links 142 and 144 to the pivot plate 146. In that the arm 92 attached to the ski pivot pipe 82 is joined to the pivot plate 146 by the steering tie-rod 148, the ski 10 is also turned. Also, during turning, rotation of the plate 146 causes the slide valve to move within the block 136 so as to obstruct the flow of fluid between the hydraulic cylinder and its associated air cushion which is connected to the torsion bar of the outside ski. Thus, for example, when the sttering handle 138 is turned to make a righthand turn, the slide valve is repositioned within block 136 so that the flow of hydraulic fluid between the piston 134 and its associated air cushion cylinder is blocked. At the same time, the path between the cylinder and the air cushion associated with the inside ski is unblocked. As a result, the full spring rate of the torsion bar associated with the outside ski is available to add to the stiffness of the suspension system of that ski whereas the air chamber is effectively in series with the torsion bar of the inside ski permitting substantial cushioning. Encountering a sudden bump or irregularity in the path of travel during a turn produces substantially less reaction on the steering assembly, all as has already been described in connection with the earlier embodiments.

Figure 6:
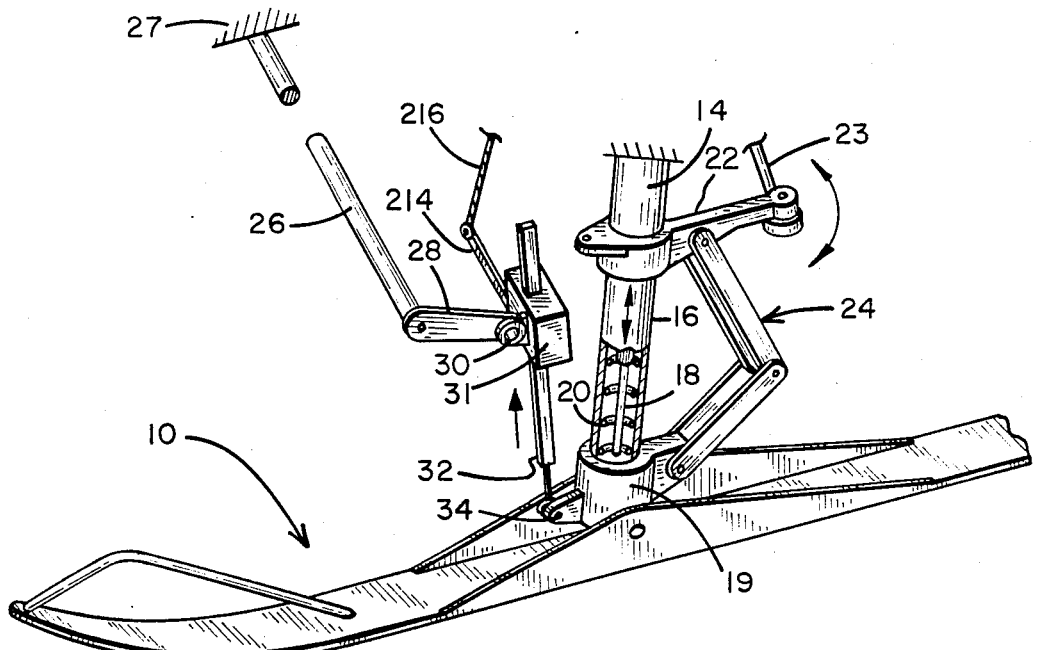
FIG. 6 illustrates a further alternative embodiment using a one-way clamping mechanism.
Figure 7:
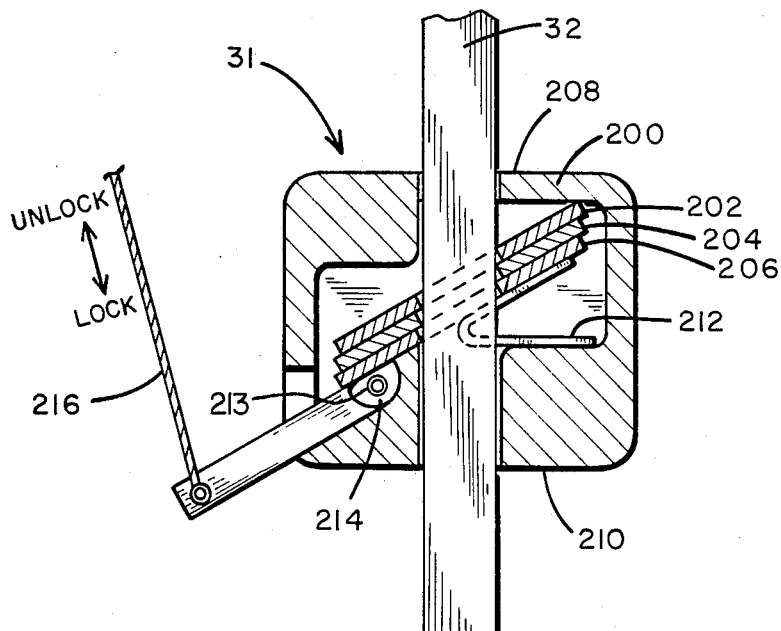
FIG. 7 is a detailed illustration of the clamping mechanism utilized in the embodiment of FIG. 6.

Referring to FIGS. 6 and 7, a still further arrangement will be described whereby torsion bar stabilization can be added to a suspension system of a recreational vehicle where the added stiffness of the torsion bar is applied only to the outer steerable member when the vehicle is negotiating a turn. In FIG. 6, only the leftmost ski 10 is illustrated and, like in FIG. 1, it is suspended from the vehicle by means of a strut 14 having a reciprocating sleeve 16 telescopingly received therein, and within the confines of the sleeve 16 and strut 14 are a shock absorber (not shown) whose piston 18 connects to the ski 10 in the hub 19. A coil spring 20 surrounds the pinston rod 18 and a portion of the shock absorber body and provides a predetermined resistance to the reciprocating motion of the sleeve 16 within the tubular strut 14.

A steering arm 22 surrounds the strut 14 and a sleeve bearing (not shown) permits the arm 22 to rotate about the strut 14 as an axis upon movement of the vehicle's steering wheel. The motion of the steering column (not shown) is coupled to the steering arm 22 by way of tie-rod 23. The steering movement of the arm 22 is transferred to the ski 10 by way of the articulated linkage assembly 24. The pivot joint between the two links comprising this assembly permit reciprocating vertical motion of the ski 10 relative to the frame to which the strut 14 is secured.

To provide torsion bar stabilization, a torsion bar 26 has one end thereof affixed to the frame. The frame is not shown but is represented by the symbol 27 in FIG. 6. The other end of the torsion bar 26 is fixedly secured to an arm or linkage 28 and the other end thereof is pivotally attached at swivel joint 30 to an actuatable means comprising a one-way clamp assembly 31. Cooperating with the clamp 31 is a further linkage 32 which is joined to the hub 19 by a suitable ball joint pivot connection 34.

The steering actuatable clamp 31 is preferably of the type described in the Holman U.S. Pat. No. 2,815,778 and, as best seen in FIG. 7, comprises a casting 200 having a bore extending therethrough for slidingly receiving the linkage 32. The casting 200 is provided with a plurality of key members 202, 204 and 206 which lock upon the linkage 32 to hold the casting 200 in positions of adjustment along the linkage 32. The keys are shown as being relatively thin washer-like members, each having an opening of substantially the same width as the linkage 32 but slightly longer than the depth dimension of th elinkage. In other words, the openings in the keys are of such a size that the keys are freely slidable along the linkage 32 when the keys are positioned at generally right angles to the linkage. When the keys are canted, however, the edges of the openings will bite into the linkage to prevent movement of the keys along the linkage. The casting 200 has its central portion cored out to form a chamber to receive the keys. The chamber extends the major portion of the length of the casting, leaving end walls 208 and 210, which contain the openings through which the linkage 32 passes.

Cooperating between the end wall 210 and an adjacent key 206 is a folded leaf spring member 212. This spring normally maintains the keys 202, 204 and 206 in their canted position as illustrated.

Pivotally mounted within the casing 200 by a pin 213 is a lever-operated cam 214 to which a steering cable 216 is attached. When the vehicle is being steered in a straight-ahead path, the control cable is sufficiently taut to elastically bend spring 212 whereby the keys 202, 204 and 206 are tipped from the position shown in FIG. 7 to an orientation where the keys are generally perpendicular to the linkage 32 and where the edges of the openings to the keys no longer bite into the linkage 32. Thus, the casting 200 is able to move freely up and down within the clamp 31 as the steerable member 10 moves reciprocally up and down because of irregularities in the terrain being traversed. The control cable 216 for each of the steerable members is arranged with respect to the steering column such that, when turning, the cable 216 associated with the outside ski becomes slack. Under this condition, the V-shaped leaf spring 212 works against the cam 214 and tips the key members 202, 204 and 206 to the position illustrated in FIG. 7. Under this condition, the steering actuatable means, i.e., clamp 31 (FIG. 6) becomes fixed on the linkage 32 and any reciprocating motion of the steerable member causes a torque to be applied via the linkage 28 to the torsion bar 26. Thus, when cornering, the outside ski has the spring rate of the torsion bar 26 added to that of the coil spring 20.

Had the spring 20 been compressed at the time that the turn had been initiated such that the steering cable 216 is slackened with the spring 20 compressed, the one-way action of the clamp 31 allows the linkage 32 to slide within the clamp if the suspension spring force afforded by coil spring 20 is greater than the force imparted by the torsion bar. Thus, functionally, the one-way clamp 31 serves the same purpose as the one-way valves 54 and 54' of the embodiment of FIG. 1.

While FIG. 6 illustrates the clamp as being located between the linkages 28 and 32, those skilled in the art will recognize that the desired result can also be achieved when the one-way clamp is located between the vehicle's frame and the other end of the torsion bar or between the outer end of the torsion bar and the linkage 28.

The invention has been described herein in considerable detail in order to comply with the Patent Statutes and to provide those skilled in the art with the information needed to apply the novel principles, and to construct and use such specialized components as are required. However, it is to be understood that the invention can be carried out by specifically different equipment and devices. For example, a rachet mechanism or self-locking shoe brake can be configured like the one-way clamp members to achieve the selective increase of the effective spring rate of the outside ski or wheel of a recreational vehicle upon turning. Therefore, various modifications, both as to equipment details and operating procedures, can be accomplished without departing from the scope of the invention itself.

What is claimed is:

1. An anti-sway apparatus for a recreational vehicle having a frame, first and second steerable members coupled to the frame respectively through independent first and second spring supported suspension devices for allowing reciprocating motion between each said steerable member and the frame, and a steering means movable relative to the frame for simultaneously controlling said steerable members, comprising:

first and second torsion spring elements, each spring element mounted independently of the other between said frame and an associated one of said steerable members;

a first one-way clutch means operatively coupled between said frame and said first steerable member, and a second one-way clutch means operatively coupled between said second torsion spring element and said frame, each of said one-way clutch means actuable to selectively and operably couple its associated steerable member with said frame through its associated torsion spring element whereby said associated torsion spring element cooperates with said associated suspension device in supporting said associated steerable member with respect to said frame, each of said clutch means being alternatively releasable to disengage the coupling between said associated steerable member and said frame through said associated torsion spring element whereby said associated suspension device alone supports said associated steerable member with respect to said frame; and an actuator means for selectively actuating only said first one-way clutch means to operably coupled said first steerable member and said frame responsive to movement of said steering means to a first position relative to the frame, and for actuating only said second one-way clutch means to operably couple said second steerable member and said frame responsive to movement of said steering means to a second position relative to the frame, and for releasing said first and second one-way clutch means whenever said steering means is intermediate said first and second positions.

2. The anti-sway apparatus of claim 1 wherein:
said first and second one-way clutch means comprise first and second free-wheeling clutches, respectively.

3. The anti-sway apparatus of claim 2 wherein:
said first and second free-wheeling clutches comprise first and second sprag mechanisms, respectively.

4. The anti-sway apparatus of claim 3 wherein:
each of said first and second spray mechanisms includes an inner race attached to one end of its associated torsion spring element, an outer race fixed with respect to said frame, and a plurality of intercoupled sprag elements selectively movable in concert and responsive to said steering means, between a wedging position relative to said inner and outer races to so operably couple its associated steerable member and said frame, and a non-wedging position relative to said races for disengaging the operable coupling.

* * * * *